US008671079B2

(12) United States Patent
Gjertsen et al.

(10) Patent No.: US 8,671,079 B2
(45) Date of Patent: Mar. 11, 2014

(54) SYSTEM AND METHOD FOR HIERARCHICAL RECOVERY OF A CLUSTER FILE SYSTEM

(75) Inventors: Robert K. Gjertsen, Austin, TX (US); Manoj N. Kumar, Austin, TX (US); David J. Craft, Austin, TX (US); Gokul B. Kandiraju, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/080,151

(22) Filed: Apr. 5, 2011

(65) Prior Publication Data

US 2012/0259818 A1 Oct. 11, 2012

(51) Int. Cl.
*G06F 17/30* (2006.01)

(52) U.S. Cl.
CPC ............................ *G06F 17/30008* (2013.01)
USPC .......................................... 707/674; 709/223

(58) Field of Classification Search
CPC .................................................. G06F 17/30008
USPC .......................................... 707/674; 709/223
See application file for complete search history.

(56) References Cited

U.S. PATENT DOCUMENTS

| 6,950,833 B2 | 9/2005 | Costello et al. |
| 2005/0132154 A1 | 6/2005 | Rao et al. |
| 2007/0271365 A1 | 11/2007 | Revanuru et al. |
| 2009/0006888 A1 | 1/2009 | Bernhard et al. |

FOREIGN PATENT DOCUMENTS

| CN | 101515296 A | 8/2009 | |
| CN | 101515296 A * | 8/2009 | .............. G06F 11/14 |

OTHER PUBLICATIONS

Bafna et al., "Chirayu: A Highly Available Metadata Server for Object Based Storage Cluster File System", Pune Institute of Computer Technology, 6 pgs.
International Search Report and Written Opinion issued on Jul. 9, 2012 in PCT/IB2012/051337.

* cited by examiner

*Primary Examiner* — Shahid Alam
(74) *Attorney, Agent, or Firm* — Terrile, Cannatti, Chambers & Holland, LLP; Robert W. Holland

(57) ABSTRACT

Hierarchical recovery of failed computing nodes to operative computing nodes within a cluster of computing nodes is managed by initiating a recovery leader at an operative node that retrieves management information from the operative nodes and applies the management information to recover filesets of a meta-fileset in a hierarchical filesystem. The use of hierarchical filesets throughout the cluster provides more rapid failover by distributing recovery load across computing nodes and supporting recovery of nodes in parallel.

16 Claims, 3 Drawing Sheets

SYSTEM AND METHOD FOR HIERARCHICAL RECOVERY OF A CLUSTER FILE SYSTEM

BACKGROUND OF THE INVENTION

1. Field of the Invention

The present invention relates in general to the field of clustered computing nodes, and more particularly to a system and method for hierarchical recovery of a cluster file system.

2. Description of the Related Art

Clusters of computing nodes help to improve system reliability by providing a failover recovery in the event of a computing node failure. If a computing node fails, applications executing on the failed computing node are recovered at another computing node of the cluster. To provide failover, computing nodes of a cluster exchange information that will support recovery of a computing node, such as with heartbeat packets.

Traditionally, clusters typically coordinate recovery of a failed node using a single computing node. Coordination of a failover recovery through a single node reduces the complexity during a crash scenario. Traditional clustered file systems do not have a hierarchy of management so that, in the event of a failure, a replica of the failed node is created and introduced to the cluster, which picks up where it left off at the time of failure. A difficulty with traditional recovery is that use of the cluster is delayed while the failover is performed, and the recovery time impacts end users.

SUMMARY OF THE INVENTION

Therefore, a need has arisen for a system and method which recovers the file system of clustered nodes in a hierarchical manner.

In accordance with the present invention, a system and method are provided which substantially reduce the disadvantages and problems associated with previous methods and systems for recovery of clustered nodes. A hierarchical file system in a cluster of computing nodes distributes recovery of a failed computing node for a more rapid recovery process.

More specifically, plural computing nodes of a cluster have a more rapid recovery of a failed node by using a hierarchical filesystem to manage computing nodes. Upon detection of a failed computing node, a computing node is elected as a recovery leader to coordinate recovery across the cluster. The recovery leader queries all computing nodes of the cluster to retrieve management information from each node, such as the filesets that are accessed by each node and the filesets that are served by each node. The recovery leader analyzes the management information to select an operative computing node that will recover the cluster meta-fileset (i.e., the root metadata of the file system) if necessary and the filesets of any failed nodes. The recovery leader initiates recovery of the meta-fileset and of filesets at the selected nodes so that the hierarchical recovery process is distributed between operative nodes for more rapid recovery times. After the filesets used by a client are recovered, the client is recovered to point to the updated fileset managers. During the recovery, client transactions are blocked, however, once recovery of failed nodes is completed, clients are released to resume normal operations. In one embodiment, a hierarchical recovery can be handled across multiple filesystems if nodes are accessing multiple filesystems with a recovery of multiple meta-fileset managers performed with a hierarchical process.

The present invention provides a number of important technical advantages. One example of an important technical advantage is that hierarchical recovery of clustered node file system provides a consistent recovery in reduced time. A more rapid recovery is provided by identifying more important nodes that form the root of operations for recovery before other nodes. Once root operations are recovered, the recovery load for other failed nodes may be distributed across the cluster and the recovery of other nodes is supported in parallel, allowing for a scalable solution. This reduces the difficulty of managing a secondary recovery which involves the failure of multiple nodes. Performance delays experienced by applications of the cluster are reduced relative to performance delays associated with recovery of a failed node through a single computing node of the cluster.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
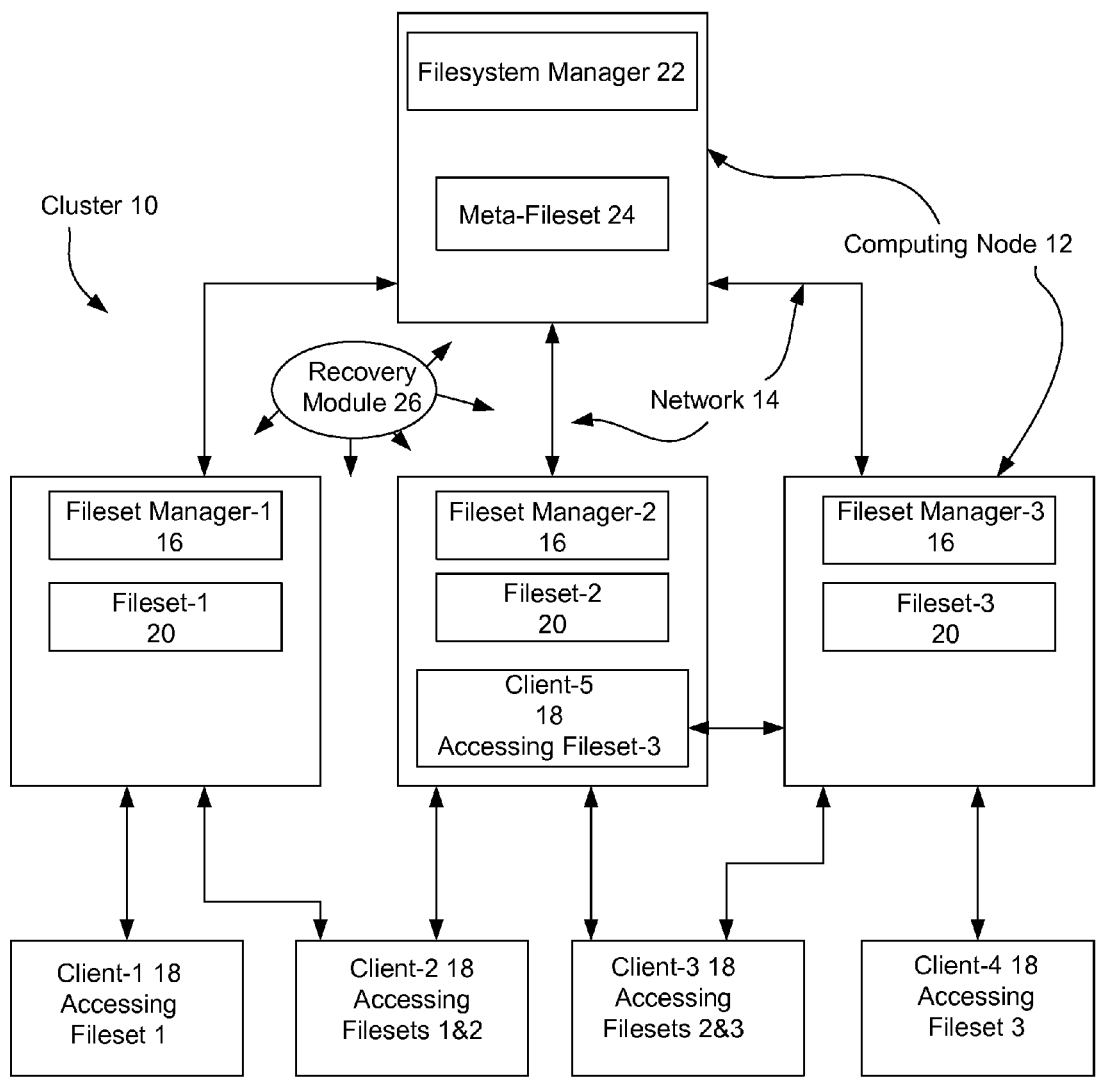
FIG. 1 depicts a block diagram of a cluster having plural computing nodes interfaced with a network and having a hierarchy of node management.

A system and method provides improved recovery of failed computing nodes in a cluster to operative nodes of the cluster through a hierarchical filesystem. Recovery is coordinated from a recovery leader running on an operative computing node, which distributes recovery tasks across the computing nodes to rebuild filesets of failed computing nodes and point client nodes to new fileset locations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts a cluster 10 having plural computing nodes 12 interfaced with a network 14 and having a hierarchy of node management. In the example embodiment depicted by FIG. 1, three fileset managers 16 serve five clients 18. Four of the clients 18 are pure clients while fileset manager-2 16 both manages a fileset 20 and supports client applications 18 that access a fileset 20 of fileset manager-3 16. The filesystem used by cluster 10 manages "light-weight" sub-filesystems called filesets 20 on each fileset manager node 16. A fileset is conceptually analogous to the root directory of a directory tree in that a fileset is the unit of management on a computing node 12, although a single computing node 12 may manage multiple filesets. One computing node 12 has a filesystem manager 22 that manages a meta-filesystem 24, which is a global fileset of all filesets 20. The hierarchical management of the filesystem is provided with overall management by filesystem manager 22 and client management by fileset managers 16.

When a computing node 12 of cluster 10 fails, hierarchical recovery of the filesystem provides consistency. Upon detection of a computing node failure, a hierarchical recovery process recovers the metafileset 24 and/or filesets 20 that were managed on the failed computing node 12 to an operative computing node 12 so that clients 18 can resume operations. The hierarchical recovery process is initiated with a recovery module 26 and accomplished by advancing through the active computing nodes of the filesystem in a step-by-step fashion to recover "root" nodes first followed by fileset manager nodes in a hierarchical manner until client nodes 18 are recovered. Upon detection of a failure of one or more computing nodes 12, a recovery module 26 on each computing node 12 detects the failure, blocks all active client transactions and initiates selection of a recovery leader to coordinate the hierarchical recovery process.

Figure 2:
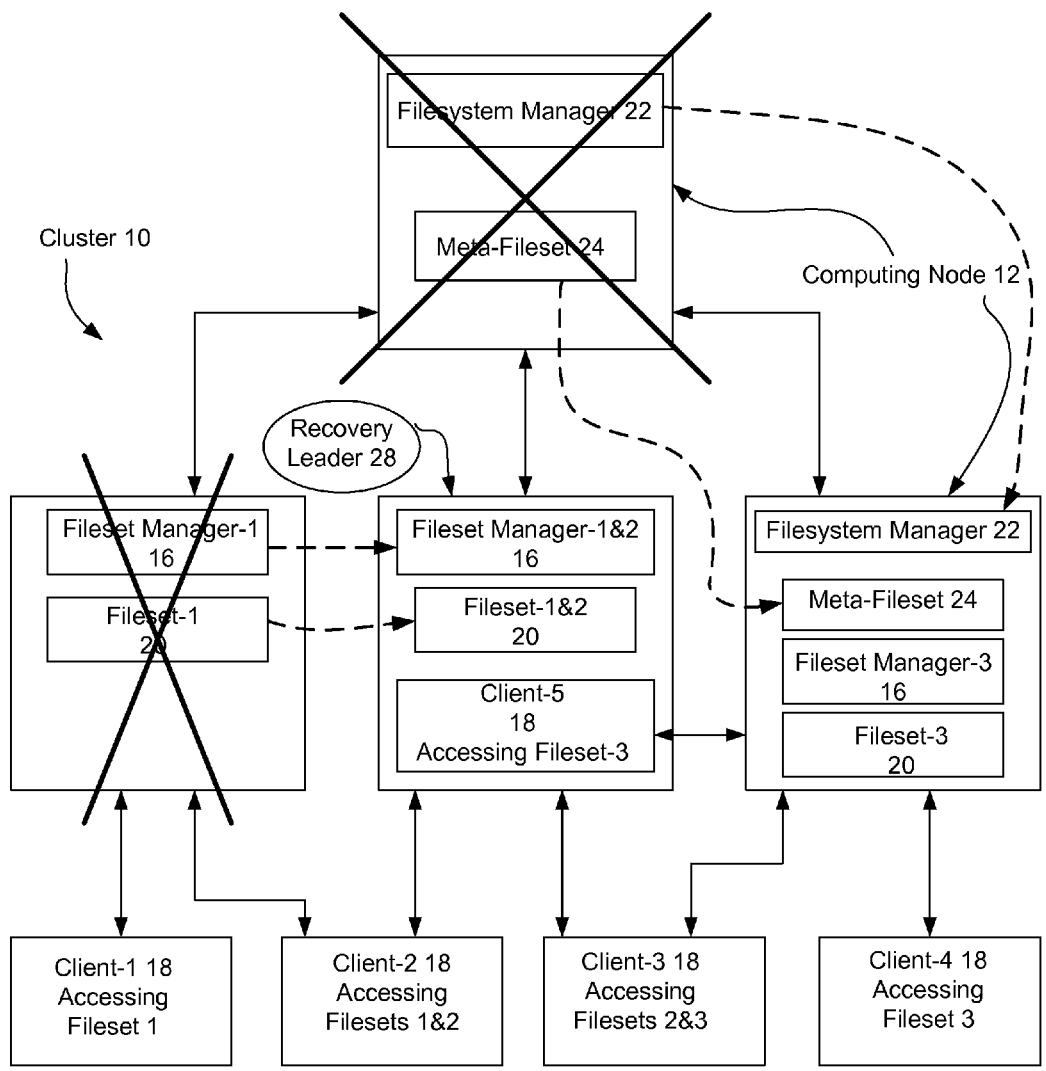
FIG. 2 depicts a block diagram of recovery from failure of computing nodes supporting operation of a filesystem manager and a fileset manager 16.

Referring now to FIG. 2, a block diagram depicts recovery from failure of computing nodes 12 supporting operation of filesystem manager 22 and a fileset manager 16. Upon detection of the computing node failures, the recovery modules elect a recovery leader 28 to coordinate recovery of the failed computing nodes to operative computing nodes. Recovery leader 28 can execute on any computing node 12 of cluster 10 and is selected in a manner that ensures selection will occur without inadvertently selecting more than one computing node 12 to act as recovery leader 28. For example, each computing node 12 maintains a list of computing nodes 12 having the same order so that the computing node 12 elected to run recovery leader 28 is the highest computing node 12 on the list that remains operative or currently active on cluster 12. Election of recovery leader 28 may be supported by query to an external interface or queries between computing nodes 12 that remain operative.

Once a computing node 12 is elected recovery leader 28, a query is made by recovery leader 28 to all operative computing nodes 12 for management information to use in coordinating recovery of failed computing nodes. For example, recovery leader 28 communicates with all active computing nodes 12 to retrieve from each computing node 12 the filesets that are accessed by that computing node 12 and the filesets that are managed (served) at that computing node 12. Recovery leader 28 analyzes the management information to determine the failed computing nodes 12 and to select operative computing nodes 12 to which the failed computing nodes will recover. For example, recovery leader 28 considers load balancing heuristics or other factors to select operative computing nodes best situated to recover failed filesystem functions. The recovery of the hierarchical filesystem then begins at the root of the entire filesystem by recovering filesystem manager 22 and meta-fileset 24 if those resided on a failed computing node. Once filesystem manger 22 and meta-fileset 24 are recovered, fileset managers 16 and filesets 20 that resided on a failed computing node are recovered. After a fileset manager 16 and its fileset 20 are recovered, clients 28 that access the fileset manager 16 may be recovered and then updated to point to the new computing node location of the recovered fileset manager and fileset. Because the hierarchical recovery process is distributed to computing nodes as the recovery proceeds, recovery of fileset managers, filesets and clients can occur simultaneously and in parallel. For instance, when the fileset 20 used by a client 18 is recovered to an operative computing node, the client 18 may be recovered even if other filesets 20 are simultaneously in recovery. After filesystem manager 22, fileset managers 16, filesets 20 and clients 18 are recovered, client transactions are released to allow normal operations to continue.

In the example embodiment depicted by FIG. 2, recovery leader 28 is established on the computing node 12 that supports fileset manager-2 16. Once recovery leader 28 determines a failure of the computing node 12 that supported filesystem manger 22, the filesystem manger 22 and meta-fileset 24 are recovered to the computing node 12 that supports fileset manager-3 16. After file system manager 22 is established, recovery leader 28 recovers fileset manager-1 16 to share the computing node 12 used by fileset manager-2 16. After the failed fileset manager 16 is recovered, recovery leader 28 recovers clients 18 to point to the locations of the recovered filesystem manager 22 and fileset manager 16.

Figure 3:
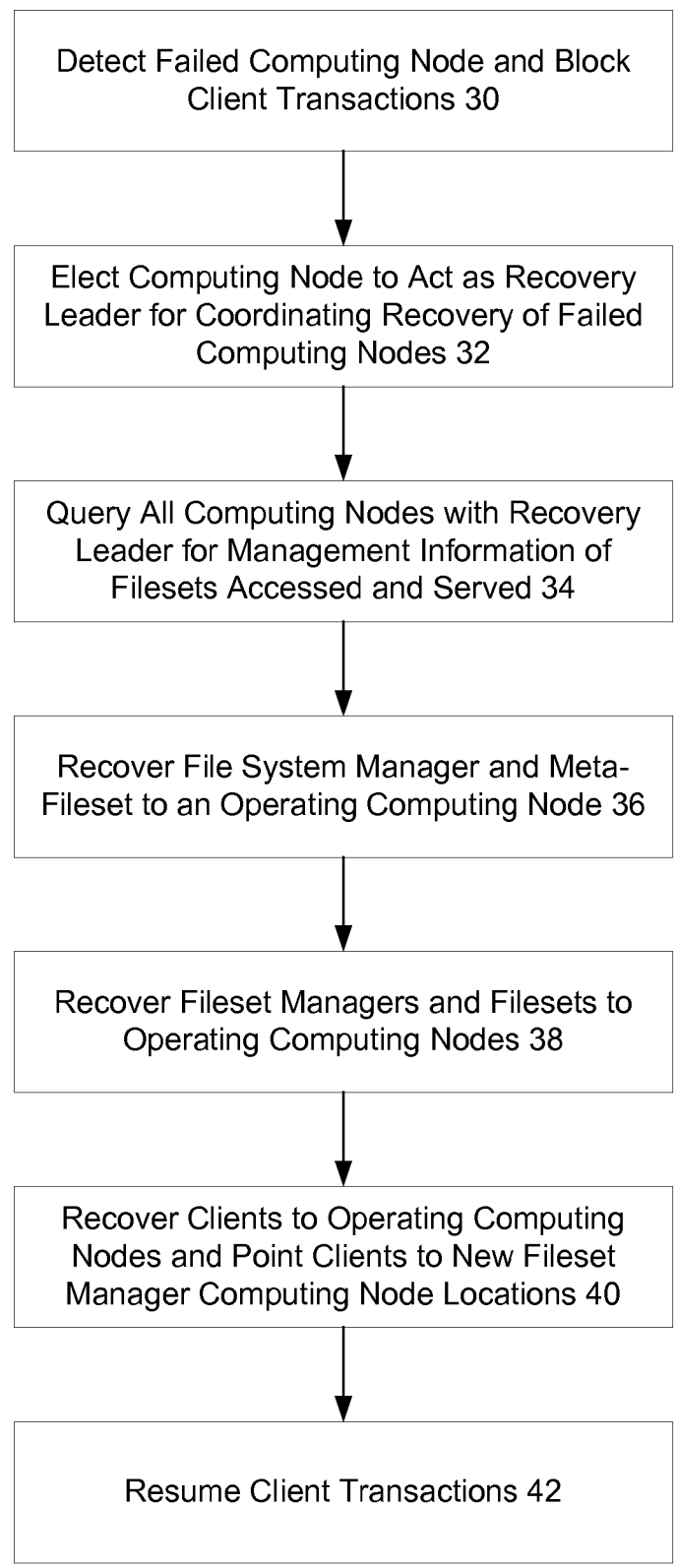
FIG. 3 depicts a flow diagram of a process for hierarchical filesystem recovery.

Referring now to FIG. 3, a flow diagram depicts a process for hierarchical filesystem recovery. The process begins at step 30 with detection of a computing node failure and blocking of client transactions. At step 32, the cluster identifies a recovery leader responsible for coordinating recovery of functions at failed nodes to operative nodes. The recovery leader may be any operative computing node of the cluster, such as the highest operative computing node on a list of computing nodes of the cluster as maintained at an external interface. At step 34, the recovery leader queries all operative computing nodes of the cluster to retrieve management information from each computing node, such as the filesets that are accessed by each computing and the filesets that are served or managed by each computing node. At step 36, the recovery leader initiates recovery of the filesystem manager at an operative computing node if the computing node that supported the filesystem manager has failed. If the computing node supporting the filesystem manager and meta-fileset has not failed, then the process continues to step 38 to recover fileset managers that were located at failed computing nodes. The recovery leader selects operative computing nodes for recovery of fileset managers and filesets from failed computing nodes by analyzing management information retrieved at step 34. At step 40, clients 18 are updated to point to the computing nodes 12 that support recovered fileset managers 16. Once all failed computing nodes are recovered to operative computing nodes, the process ends at step 42 by releasing the cluster to begin client transactions and normal operations.

Although the present invention has been described in detail, it should be understood that various changes, substitutions and alterations can be made hereto without departing from the spirit and scope of the invention as defined by the appended claims.

What is claimed is:

1. A method for recovery of one or more computing nodes of a cluster having plural computing nodes managed with a meta-fileset and plural filesets, the method comprising:

detecting failure of one or more computing nodes;
blocking client computing node transactions at the cluster upon detecting failure of one or more computing nodes;
designating one of the computing nodes as a recovery leader;
retrieving to the recovery leader management information stored at the computing nodes;
selecting with the recovery node one of the computing nodes as a file system manager;
establishing the meta-fileset at the file system manager;
selecting one of the computing nodes as a fileset manager for each of the plural filesets;
establishing each of the filesets at its selected computing node; and
updating the computing nodes to point to the file system manager and fileset managers;
recovering client computing nodes of the cluster to use the filesystem manager and fileset managers; and
releasing the blocking of the client computing nodes upon recovering client computing nodes of the cluster to use the filesystem manager and fileset managers.

2. The method of claim 1 wherein designating one of the computing nodes as a recovery leader further comprises:
retrieving a list of computing nodes active at the cluster; and
designating the first computing node on the list as the recovery leader.

3. The method of claim 1 wherein the retrieving to the recovery leader management information stored at the computing nodes further comprises:
sending from recovery leader to each computing node a request for the management information; and
storing the management information at the recovery leader.

4. The method of claim 3 wherein the management information comprises the filesets accessed by each computing node and the filesets served by each computing node.

5. The method of claim 1 wherein the selecting with the recovery node one of the computing nodes as a file system manager further comprises:
determining that an existing file system manager did not fail; and
in response to the determining, selecting the existing file system manager as the file system manager.

6. The method of claim 1 wherein selecting one of the computing nodes as a fileset manager for each of the plural filesets further comprises:
determining that an existing fileset manager did not fail; and
in response to the determining, selecting the existing fileset manager as fileset manager for its selected computing node.

7. The method of claim 1 wherein establishing each of the filesets at its selected computing node further comprises simultaneously recovering first and second computing nodes, the first node having a first fileset and the second node having a second fileset.

8. The method of claim 1 wherein selecting one of the computing nodes as a fileset manager for each of the plural filesets further comprises:
analyzing the management information to select for a predetermined condition; and
applying the predetermined condition to select a computing node as a fileset manager to replace a failed computing node associated with a fileset.

9. A method for recovery of one or more failed computing nodes in a cluster having plural operative computing nodes and a hierarchical file management, the method comprising:

blocking all active client transactions upon detecting failure of the one or more computing nodes;

selecting one of the plural operative computing nodes to act as recovery leader of the cluster;

retrieving management information to the recovery leader from each of the plural operative computing nodes, the management information including at least the filesets accessed by each of the plural operative computing nodes and the filesets served by each of the plural operative computing nodes;

applying the management information to associate filesets of the one or more failed computing nodes to one or more of the plural operative computing nodes;

recovering the one or more failed computing nodes to one or more of the plural operative computing nodes by the associated filesets; and releasing all active client transactions upon recovering all failed computing nodes.

10. The method of claim 9 wherein applying the management information further comprises:

establishing a computing node as a file system manager having a meta-fileset; and applying the meta-fileset to simultaneously establish plural computing nodes as fileset managers, each fileset manager having a fileset.

11. The method of claim 10 further comprising establishing a client computing node after all fileset managers used by the client computing node is established.

12. The method of claim 11 wherein establishing a client further comprises establishing the client before all fileset managers are established.

13. The method of claim 9 wherein the applying the management information to simultaneously recover the one or more failed computing nodes to plural operative computing nodes further comprises applying the management information to select the operative computing nodes based upon one or more predetermined conditions.

14. A system for recovering one or more failed computing nodes of a cluster having plural computing nodes to one or more operative computing nodes of the cluster, the system comprising:

a recovery module stored on each of plural of the computing nodes and operable to select a computing node to execute a recovery leader; and a recovery leader executing on the selected computing node and operable to block all active client transactions at the cluster, to retrieve management information from the one or more operative computing nodes of the cluster to select one or more operative computing nodes to execute a filesystem manager associated with a meta-filesystem, to execute one or more fileset managers, each fileset manager associated with a fileset, to recover the one or more failed computing nodes of the cluster to use the filesystem manager and fileset managers at the one or more operative computing nodes, and to release the blocking of the active client transactions at the cluster upon recovery to the filesystem manager and the one or more fileset managers.

15. The system of claim 14 wherein the management information comprises the filesets accessed by each node and the fileset served by each node.

16. The system of claim 14 wherein the recovery leader is further operable to simultaneously initiate recovery of plural fileset managers at plural computing nodes.

* * * * *